Patented June 9, 1942

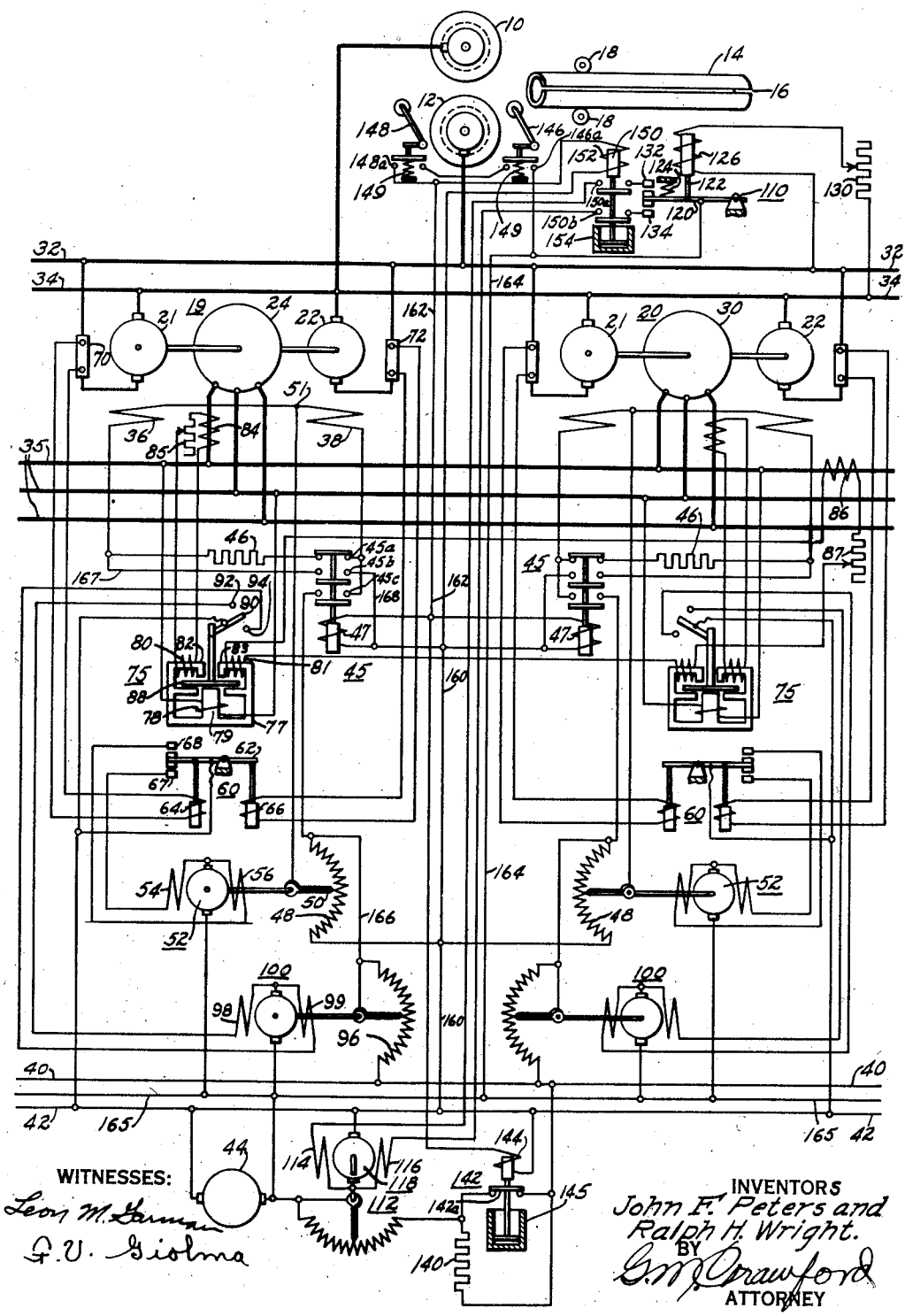

2,286,102

UNITED STATES PATENT OFFICE 2,286,102

WELDING APPARATUS

John F. Peters and Ralph H. Wright, Edgewood, Pa., assignors to Westinghouse Electric & Manufacturing Company, East Pittsburgh, Pa., a corporation of Pennsylvania Application February 23, 1939, Serial No. 257,946

6 Claims. (Cl. 171—312)

Our invention relates generally to welding, and it has reference, in particular, to direct current welding systems for the resistance welding of pipe or conduit.

Heretofore, alternating current has been widely used in the resistance welding of pipe and conduit because of the relative ease with which the tremendously large welding currents required may be obtained. However, with the present day increased welding speeds, it has been found that certain undesirable results arise from the use of alternating current. The principal one, namely, the "stitch effect" is caused by the periodical reduction of the welding current to the zero value and results in unwelded spots at periodic intervals along the seam.

Direct current generators of the homopolar or uni-polar type have been used to some extent in resistance pipe welding, since generators of this type may be built in sizes large enough to supply the required welding current from a single generator. However, the highly specialized design of this type of generator makes it relatively expensive to build and somewhat difficult to operate. Because of the tremendously strong magnetic field necessary in homopolar or uni-polar generators, there is a correspondingly large amount of electrical inertia in the field circuit, so that accurate control of the welding current may not be readily secured with generators of this type through regulation of the energization of the field circuit, and other more complicated and more expensive methods must be used.

Direct current generators of the commutator type, while rapidly responsive to field control, have not, up to the present time, been built in sizes of sufficient capacity to supply from a single generator the 40,000 to 250,000 amperes of welding current that are required in resistance pipe welding operations, depending on the size of the pipe and the nature and thickness of the material used. As it is not practical to build direct current generators of the commutator type of even 25,000 amperes capacity or thereabouts, as compound generators, because of the enormous cross section of conductor which would be required for field windings to carry currents of this magnitude, it is, therefore, impossible to connect a number of generators of such capacity for operation in parallel circuit relation and utilize the usual equalizer connections therebetween, or compensating windings, for maintaining a proper division of the welding current between the generators.

Since the terminal voltage of generators used in resistance welding systems is of the order of from 2 to 7 volts, it will be realized that even slight variations in the internal resistance of the armature, the contact resistance of the brushes and the resistance drop in the brushes themselves may result in variations in the terminal voltage of the generators that are relatively large in proportion to the terminal voltage. As such variations cause fluctuations in the proportion of the welding current supplied by the different generators, it will be realized that an unstable system may readily result. Accordingly, it is exceedingly important to provide for maintaining the proper division of the welding current among a plurality of direct current generators of the commutator type which are connected in parallel circuit relation for supplying welding current for resistance pipe welding operations.

An object of our invention, generally stated, is to provide for controlling the division of welding current among a plurality of direct current generators which are connected in parallel circuit relation for supplying welding current to resistance pipe welding apparatus.

More specifically, it is an object of our invention to provide a resistance welding system for welding pipe or conduit having a plurality of relatively low voltage direct current generators of the commutator type connected in parallel circuit relation for supplying welding current to the welding electrode members, and maintain a predetermined division of the welding current among the generators by controlling the excitation of the generators in accordance with variations in the input to the prime movers of the said generators.

Another object of our invention is to provide for maintaining a predetermined division of the welding current among a plurality of generating means which are connected in parallel circuit relation for supplying welding current to the electrode members of resistance pipe welding apparatus by controlling the excitation of the said generating means in accordance with variations in the input current of their respective driving means relative to the total input of the driving means.

A further object of our invention is to provide a quick-response source of welding current for resistance pipe welding by utilizing a plurality of direct current generators of the commutator type which are connected in parallel circuit relation with the electrode members, maintaining a predetermined division of welding current among the generators by controlling the excitation thereof in accordance with variations in the input to their respective driving means, and also controlling the excitation thereof to maintain a predetermined flow of welding current between the electrode members.

Yet another object of our invention is to provide a simple and effective system of control for direct current generators of the commutator type which are connected in parallel circuit relation so as to maintain a predetermined division of the welding current among the generators and control the energization of the electrode members in accordance with the passage of a pipe or conduit member therebetween.

In practicing our invention in a preferred form, a plurality of direct current generators of the commutator type are connected in parallel circuit relation for supplying welding current to the welding electrode members of resistance pipe welding apparatus. The field windings of the generators are connected to a separate source of excitation and the energization therefrom of the said field windings is controlled both in accordance with variations in the input current of the driving motor of the particular generator relative to the total input current of a number of the driving motors, so as to maintain a predetermined division of the welding current among the generators without requiring the use of compound or compensating field windings which it is impossible to use because of the cross section of conductor which would be necessary, and in accordance with the voltage between the welding electrode members, so as to maintain a predetermined flow of total welding current during a welding operation.

The energization of the generator field windings is further controlled in accordance with the position of a pipe member that is to be welded, so that the electrode members cannot be energized before the entrance of the pipe member between them, and will be deenergized before the pipe member leaves the electrode members, thus preventing burning of the electrode members and the pipe member through arcing. The energization of the generator field windings is further controlled so as to provide for increased energization thereof for a predetermined interval of time after energization, and thus more rapidly overcome any inertia of the field circuit and welding circuit, and more rapidly establish stable welding conditions.

For a complete understanding of the nature and scope of our invention, reference may be had to the following detailed description taken in connection with the single figure of the accompanying drawing, which illustrates diagrammatically a resistance pipe welding system embodying a preferred form of our invention.

Referring particularly to the single figure diagram, the reference numerals 10 and 12 denote, respectively, rotatable welding electrode members which are disposed to engage the pipe member 14 on opposite sides of a seam 16 that is to be welded. Movement of the pipe member 14 relative to the electrode members 10 and 12 may be effected in any suitable manner, as, for example, by means of the drive rolls 18 which may be operatively connected with suitable driving means (not shown) in any manner well known in the art.

In order to provide for the energization of the electrode members 10 and 12, generating means 19 and 20, comprising, for example, pairs of generators 21 and 22, are coupled to suitable driving means such as the driving motors 24, and 30, respectively, and connected in parallel circuit relation to the welding bus conductors 32 and 34, which may be electrically connected to the electrode members 10 and 12 in any manner well known in the art of pipe welding. The motors 24 and 30 may, as illustrated, be connected to a suitable alternating current source by conductors 35.

As the operation and control of the generating means 19 and the generating means 20, and the circuits used in connection therewith are substantially the same, the following description describes in detail only the operation and control of, and the circuits connected with the generators 21 and 22 of the generating means 19, and those of any number of other such generating means may be readily understood therefrom.

The field windings 36 and 38 of the generators 21 and 22, respectively, are connected to a suitable variable potential source of energization, such as the control bus conductors 40 and 42, which are energized from the generator 44, by means of a control switch 45 which normally connects a discharge resistor 46 across the field windings, and which is provided with an operating winding 47.

In order to maintain a predetermined division of the welding current between the generators 21 and 22, which are driven by the common driving motor 24, a balance resistor 48 is connected in shunt circuit relation across the field windings 36 and 38 with a movable contact arm 50 thereof connected to a common point 51 between the windings. An operating motor 52 having opposing field windings 54 and 56 is operatively connected to the contact arm 50 for effecting actuation thereof to vary the relative proportions of the portions of the balance resistor 48 shunting the field windings 36 and 38, respectively, thus varying the relative energization of the two field windings 36 and 38 from the source 44, so as to control the relative values of the welding current supplied by the generators 21 and 22.

A current balance relay 60, comprising a pivoted contact arm 62 which is actuated in accordance with the energization of opposing operating windings 64 and 66 to engage either of the stationary contact members 67 and 68, may be provided for controlling the energization of the field windings 54 and 56 of the balance resistor motor 52. By connecting the operating windings 64 and 66 for energization in accordance with the welding current supplied by the generators 21 and 22, respectively, actuation of the moving contact arm 50 of the balance resistor 48 may be suitably effected in accordance with variations between the welding currents supplied by the generators 21 and 22, respectively. For example, the operating winding 64 may be connected to a shunt member 70 in the load circuit of the generator 21 and the operating winding 66 connected to a shunt member 72 in the load circuit of the generator 22.

In order to control the division of the welding current between the generating means 19 and 20, we have found it preferable in the present instance, where the driving motor 24 is energized from an alternating current source, to control the energization of the field windings 36 and 38 of the generating means 19 collectively, by means such as the load balance relay 75 which is associated with the input circuit of the driving motor 24. The load balance relay 75 may, for example, comprise a magnetic core 77 of substantially the shape indicated in the accompanying drawing, having a potential winding 78 on the core portion 79 thereof, which is energized from the supply conductors 35, and opposing current windings 80 and 81 on the core portions 82 and 83 which are respectively energized from current transformers 84 and 86 which are associated with the input circuit conductors of the motor 24 and the main supply conductors 35, respectively. Variable resistors 85 and 87 are provided for permitting adjustment of the relative energization of the windings 80 and 81, respectively. A rotatable disc member 88 is suitably positioned in the magnetic field set up by the potential and current windings between the core portions 79, 82 and 83, so as to be actuated thereby to operate a movable contact arm 90 to engage either of the stationary contact members 92 or 94, depending on the relative energization of the opposing current windings 80 and 81. The energization of the windings may be so proportioned that the relay 75 operates substantially in accordance with the desired proportioning of the welding current between the different generating means, since the input current of any one of the driving motors will vary substantially in accordance with the welding current supplied by the generating means driven thereby.

By providing a motor operated rheostat 96 in series circuit relation with the field windings 36 and 38 of the generators 21 and 22, and controlling the energization of the opposing field windings 98 and 99 of the operating motor 100 thereof by the load balance relay 75, the energization of the field windings 36 and 38 may be suitably varied so as to effectually maintain a predetermined relation between the total welding current supplied by the generators 21 and 22 of the generating means 19, and the total welding current supplied by all of the generating means whose driving motors are energized from the supply conductors 35.

In order to maintain a predetermined value of total welding current during a welding operation, regulating means 110 may be provided for controlling the operation of a motor operated rheostat 112, by selectively controlling the energization of the opposing field windings 114 and 116 of the operating motor 118 thereof, so as to vary the voltage applied to the control bus conductors 40 and 42 from the generator 44. For example, the regulating means 110 may comprise a pivoted contact arm 120 having an armature 122 operatively connected thereto so as to actuate the arm against a biasing spring 124 upon the energization of the operating winding 126. By connecting the operating winding 126 across the welding bus conductors 32 and 34 with a variable resistance 130 disposed in series circuit relation therewith, the energization of the operating winding 126 may be suitably determined so as to oppose the actuating force of the biasing spring 124, and cause the contact arm 120 to selectively engage either of the stationary contact members 132 to 134, depending on the voltage across the welding bus conductors 32 and 34, so as to effect energization of the field windings 114 or 116 of the control motor 118 to compensate for any variation thereof from the desired value, and thus maintain a predetermined flow of welding current between the electrode members 10 and 12.

As it has been found desirable to provide for increased excitation of the field windings of the generators upon the initiation of a welding operation, so as to overcome the electrical inertia of the field and welding circuits, a field forcing resistor 140 is connected in series circuit relation between the generator 44 and the control bus conductor 40, and a field forcing relay 142 having an operating winding 144 is provided, having normally closed contact members 142a which provide a shunt path about the resistor 140. Time delay means such as the dashpot 145 are provided for preventing the operation of the relay 142 for a predetermined interval of time after energization of the operating winding 144, so as to delay the insertion of the resistor 140 into the energizing circuit of the field windings 36 and 38, and thus effect initially increased excitation of the field windings.

In order to control the energization of the welding electrode members 10 and 12 in accordance with the position of a pipe member relative thereto, so as to prevent engagement of the pipe member with, or disengagement from the electrode members while they are energized, auxiliary switches 146 and 148 for controlling the energization of the operating windings 47 and 144 of the control switch 46 and field forcing relay 142, respectively, are positioned immediately preceding and following the electrode members, so as to be engaged by a pipe member 14 and actuated thereby. The auxiliary switches may be normally maintained in the deenergized position by biasing means such as the springs 149.

An auxiliary relay 150 having an operating winding 152 may be provided for controlling the energizing circuit of the field windings 114 and 116 of the motor operated rheostat 112. Time delay means such as the dashpot 154 is provided for preventing operation of the relay 150 for a predetermined interval of time after the energization of its operating winding 152. By controlling the energization of the operating winding 152 through the auxiliary switches 146 and 148, the regulating means 110 may be rendered ineffective after the disengagement of the auxiliary switch 146 by the pipe member 14. In this manner, the tendency of the regulating means to attempt to maintain the voltage across the welding bus conductors 32 and 34 following the passing of a pipe member from between the electrode rolls, may be prevented, and the setting of the motor operated rheostat 112 may thus be maintained at substantially the value necessary to maintain the desired welding current during a welding operation. The energizing circuit of the field windings 36 and 38 of the generators is thereby more readily conditioned for the maintenance of the desired value of the welding current upon the commencement of a subsequent welding operation.

The operation of the welding system embodying the preferred form of our invention is substantially as follows: Upon the entrance of the pipe member 14 between the electrode members 10 and 12, the auxiliary switches 146 and 148 are successively engaged thereby, and contact members 146a and 148a, respectively, are closed. Energizing circuits are thereby completed as follows; for the operating winding 47 of the control switch 46, through the circuit extending from the generator 44 through control bus conductor 42, conductor 160, operating winding 47, conductor 162, contact members 148a and 146a, conductor 164 and the constant potential control bus conductor 165 back to the generator 44; for the operating winding 144 of the field forcing relay 142 from the control bus conductor 42, through the operating coil 144, conductor 162, contact members 148a and 146a, and conductor 164 back to the control bus conductor 165; and for the operating winding 152 of the auxiliary relay 150, from control bus 42 through conductor 160, operating winding 152, contact members 148a and 146a, and conductor 164 back to the control bus conductor 165. Operation of the control switch 45 disconnects the field windings 36 and 38 from the field discharge resistor 46 and connects them for energization of the control bus conductors 40 and 42 through the circuit extending from conductor 40, through the rheostat 96, conductor 166, contact members 45c, field winding 38, field winding 36, conductor 167, contact members 45b, conductor 168, and conductor 160 back to control bus conductor 42, thus effecting energization of the electrode members 10 and 12.

After a predetermined interval of time, the field forcing relay 142 operates, opening contact members 142a and inserting the resistor 142 in series circuit relation with the generator 44 and the control bus conductor 40, so as to effect a reduction in the energization of the field windings 36 and 38 of all the generating means at substantially the same time as the welding circuit becomes stabilized. At preferably about the same time, the auxiliary relay 150 operates to close contact members 150a and 150b and connect the regulating means 110 for controlling the energization of the opposing field windings 114 and 116 of the rheostat motor 118, so as to control the voltage across the control bus conductors 40 and 42 and maintain the welding current at a predetermined value.

Should a variation occur between the welding currents supplied by the generators 21 and 22, a corresponding variation in the energization of the operating windings 64 and 66 of the current balance relay 60 results, and the movable contact arm 62 is actuated to selectively energize either the field winding 54 or the field winding 56 of the operating motor 52 from the control bus conductors 42 and 165, to effect actuation of the moving contact arm 50 of the balance resistor 48 in such direction as to vary the relative energization of the field windings 36 and 38 to correct any existing variation between the welding currents supplied by the generators 21 and 22, thus restoring the balance of welding current therebetween.

Upon the occurrence of a variation in the value of combined welding currents supplied by the generators 21 and 22 of the generating means 19, relative to the total welding current, the load on the motor 24 varies accordingly, thus causing a like change in the input current to the motor, relative to the total input current of all the motors. The relative energization of the opposing current windings 80 and 81 of the load balance relay 75 is likewise altered, and the movable contact arm 90 is actuated to engage either one or the other of the stationary contact members 92 or 94, depending on the direction of the relative change of energization of the opposing current windings 80 and 81 of the relay. The operation of the rheostat motor 100 being controlled thereby, the energization of the field windings 36 and 38 may be altered collectively to compensate for such change and thus restore the desired division of the welding current among the different generating means.

Upon the completion of a welding operation, the pipe member 14 disengages the auxiliary switch 146 before it disengages the electrode members 10 and 12. The auxiliary switch 146 immediately returns to the deenergized position, opening contact members 146a, thereby interrupting the energizing circuits for the operating winding 47 of the control switch 45, the operating winding 144 of the field forcing relay 142, and the operating winding 152 of the auxiliary relay 150. The control switch 45 opens, disconnecting the field windings 36 and 38 from the control bus conductors 40 and 42, thus effecting deenergization of the electrode members 10 and 12, and connecting the field discharge resistor 46 across the field windings.

Deenergization of the operating winding 144 of the field forcing relay 142 results in the closure of the contact members 142a, so that the field forcing resistor 140 is thereby shunted and the energizing circuit for the field windings 36 and 38 is thereby conditioned for the initiation of a subsequent welding operation, so as to provide initially increased energization thereof. Deenergization of the auxiliary relay 150 is effected at the same time, thus preventing the regulating means 110 from attempting to vary the position of the rheostat 112 and maintain the open circuit voltage of the welding bus conductors 32 and 34 at the closed circuit value, and maintaining the rheostat in substantially the position occupied during a welding operation, so as to further condition the system for the initiation of a subsequent welding operation.

From the above-detailed description, taken in connection with the accompanying drawing, it may be understood that we have provided a resistance pipe welding system wherein a plurality of direct current generators of the commutator type are connected for parallel circuit operation to supply the necessary welding current to the electrode members. Division of the welding current among the generators is maintained in a simple and effective manner without requiring the use of series or compensating field windings which have to be connected in the load circuit of the generator. Furthermore, regulation of the welding current is accurately maintained within very close limits of the desired value, through the control of the field excitation of the generators, resulting in a quick-response current control system that is both simple and effective. By utilizing field forcing means in the manner hereinbefore described for obtaining initially increased energization of the field windings of the generators, and providing time delay means for controlling the operation of regulating means used for maintaining a predetermined value of welding current during a welding operation, the inherent inductance of the welding and field circuits may be more quickly overcome, and the welding current more quickly established at the desired welding value so as to obtain better welds and eliminate a large percentage of the losses hereinbefore incurred through faulty welds.

Since certain changes may be made in the above construction, and different embodiments of the invention may be made without departing from the spirit and scope thereof, it is intended that all the matter contained in the above description or shown in the accompanying drawing, shall be considered as illustrative and not in a limiting sense.

We claim as our invention:

1. In a power system, the combination of, a plurality of direct current generating means having excitation windings for controlling the output thereof, means connecting the generating means in parallel circuit relation for supplying current to a work circuit, a driving motor connected with each generating means, regulating means controlling the excitation of each generating means, relay means responsive to changes in the input current of a driving motor relative to the total input current of the driving motors for effecting operation of the regulating means to maintain a predetermined division of the load current between the generating means, and additional regulating means for collectively controlling the excitation of the generating means to maintain a predetermined load current.

2. A power system comprising, a plurality of pairs of direct current generators of the commutator type connected in parallel circuit relation for applying a relatively low voltage to a load circuit, a driving motor for each pair of the generators, a field winding for each generator, a source of excitation for said field windings, means controlling the relative energization of the field windings of one of the pairs of generators to maintain a predetermined division of the load current between the generators of the said pair, additional means responsive to variations in the input current of the driving motor of the said pair of generators relative to the total input current of the said driving motors for substantially maintaining a predetermined division of the load current among the pairs of generators, regulating means operable to control the energization of the field windings to maintain a predetermined load current, an auxiliary relay for rendering the regulating means operable a predetermined time after energization, time delay means energizable to reduce the energization of the field windings after a predetermined time, and auxiliary switch means controlling the energization of the auxiliary relay and the time delay means.

3. The combination in a power system for supplying electrical energy to a load circuit, of a plurality of direct current generators of the commutator type coupled in paired relation and connected in parallel circuit relation for supplying a relatively heavy load current to the load circuit at a relatively low voltage, a driving motor for each pair of the generators, a field winding for each of the generators, relay means responsive to a differential between the welding current supplied by the generators of one of the said pairs of generators for controlling the relative energization of the field windings thereof to maintain a predetermined relative loading on each of the generators, additional relay means responsive to variations in the input current of the driving motor of said pair of generators relative to the total input current of the driving motors for controlling the energization of the field windings of the said pair of generators so that the pair of generators will carry a predetermined proportion of the total load current, and means for controlling the energization of the field windings of the generators collectively to maintain a predetermined flow of load current.

4. In a power system, the combination of, a plurality of pairs of direct current generators connected in parallel circuit relation for applying a relatively low voltage to a load circuit, a driving motor for each pair of the generators, a field winding for each generator, a source of energization for the field windings, means controlling the relative energization of the field windings of a pair of generators from the source in accordance with the differential between the current supplied by each of the generators, relay means operable in accordance with the differential between the input current of the driving motor of the said pair of generators and the total input current of the driving motors to control the energization of the field windings of the said pair of generators so as to maintain a predetermined division of the load current among the pairs of generators, regulating means for collectively controlling the energization of the field windings of the generators to maintain a predetermined flow of load current, auxiliary switch means operable to effect initially increased energization of the field windings, control switch means responsive a predetermined time after operation of the auxiliary switch means to reduce the energization of the field windings to substantially normal, and time delay means for preventing operation of the regulating means before the lapse of a predetermined interval of time after energization of the field windings.

5. In a power system for supplying electrical energy to a load circuit in combination, a plurality of direct current generators of the commutator type connected in parallel circuit relation for supplying current to the load circuit, a plurality of driving motors connected to drive the generators in paired relation, a field winding for each generator, electro-responsive means for simultaneously varying the energization of the field windings of one pair of generators in opposite senses, current responsive means energized in accordance with the currents supplied by the generators of said pair for controlling said electro-responsive means to maintain a predetermined current ratio between said generators, additional electro-responsive means for varying the energization of the field windings of said pair of generators in the same sense, and a load responsive relay energized in accordance with the input to the driving motor of said pair of generators and the input to all of the motors for controlling said additional electro-responsive means to maintain a predetermined division of the current among said pairs of generators.

6. A power system comprising, a plurality of relatively low voltage direct current generators of the commutator type connected in parallel circuit relation for supplying electrical energy to a load circuit, a field winding for each generator, a plurality of alternating current driving motors energized from a relatively high voltage source connected to drive the generators in paired relation, means for varying the energization of the field windings of the generators of a pair in opposite senses, a current balance relay energized in accordance with the currents supplied by the generators of said pair for controlling said means to maintain a predetermined division of the load current between said generators, electro-responsive means for varying the energization of the field windings of each pair of generators in the same sense, and a load balance relay of the induction type having operating windings energized in accordance with the input to the driving motor of said pair of generators and in accordance with the input to all of the driving motors for controlling the electro-responsive means so as to maintain a predetermined division of the load current among the pairs of generators.

JOHN F. PETERS.
RALPH H. WRIGHT.